Sept. 30, 1958  H. J. RICHARDS  2,853,838
GRINDING APPARATUS
Filed Sept. 20, 1956

INVENTOR.
HAROLD J. RICHARDS
BY Archworth Martin
his ATTORNEY

United States Patent Office 2,853,838
Patented Sept. 30, 1958

2,853,838

GRINDING APPARATUS

Harold J. Richards, Pittsburgh, Pa.

Application September 20, 1956, Serial No. 611,003

2 Claims. (Cl. 51—170)

My invention relates to grinding apparatus, and more particularly to grinding machines of small size that can be used after the manner of a hand tool.

The object of my invention is to provide a grinding device of the character referred to, wherein the shaft which carries a rotatable grinding element is disposed at right angles to the handle by which the grinding element is supported, the grinding element being rotated by means of a shaft in the handle and a shaft that carries the grinding element.

The apparatus is particularly suitable for the grinding and polishing of surfaces that are at areas difficult of access, such as concave surfaces, depressed areas, etc., found in automobile bodies and fenders.

As shown in the accompanying drawing, Figure 1 is a plan view of the apparatus, partly in section;

Figures 1, 2, 3:
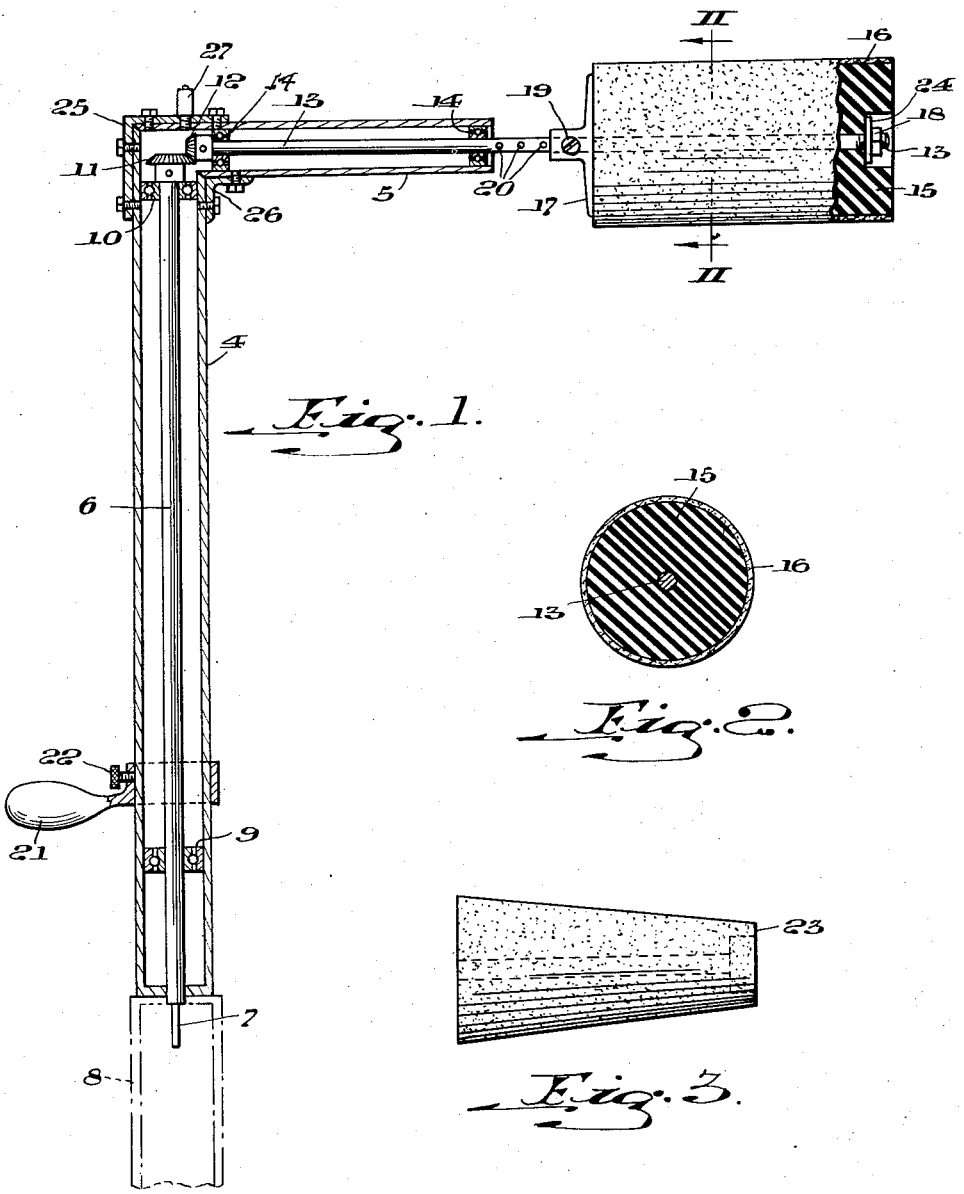
Fig. 2 is a view taken on the line II—II of Fig. 1.
Fig. 3 shows a roller and abrasive sleeve of different contour than that in Fig. 1.

The supporting frame for the mechanism and the abrasive roller comprises a tube 4 and a tube 5. The drive shaft 6 is adapted for connection to the holding socket 8 of an electrical drill shaft or other rotative member, such as a flexible shaft. The shaft 6 is supported by bearings 9 and 10 and has a gear wheel 11 that meshes with a gear wheel 12 which turns a driven shaft 13 that is supported in the tube 5 by bearings 14.

The shaft 13 extends through a rubber roll 15 of generally solid structure but which is somewhat resilient so as to be capable of expansion and contraction in an abrasive sleeve 16. A nut 18 is threaded on to the shaft to compress the roll against a disc 17 that is adjustable longitudinally of the shaft 13 by a screw 19 which is engageable in recesses 20 in the shaft. The roll is thereby expanded into snug fit with the sleeve 16 which, on its surface, has suitable abrasive or polishing materials.

A handle 21 is adjustable around the tube 4 and longitudinally thereof and held in place by a set screw 22, for convenience of manipulation of the tool. The roller 15 may suitably be of two inch diameter or smaller, to facilitate the grinding of concave areas of short radii or in confined spaces. Rolls of various diameters and lengths can readily be placed on the shaft 13, and tapered rolls and sleeves such as the sandpaper sleeve at 23 in Fig. 3 used. The rolls will be recessed in their outer ends to receive the nut 18 and a washer 24, thus avoiding engagement of the nut with metal surfaces being operated upon.

To disassemble the tubes and their shafts, the screws that connect angles 25 and 26 to the tubes 4 and 5 will be removed after which the tubes can be separated for removal of the shafts and gear wheels therefrom. A grease fitting 27 is provided for the gear wheels and the shafts.

I claim as my invention:

1. Grinding apparatus that comprises a frame having two tubes disposed at right angles to each other, means detachably connecting together the adjacent ends of the tubes, shaft bearings in the tubes, a drive shaft in one of the tubes, means on the outer end of the shaft for connecting a power device thereto, a gear wheel on the inner end of the shaft, where the two tubes are connected, a shaft in the other tube and extended beyond the outer end thereof, shaft bearings in said other tube, near its ends, an abrading cylinder connected to the projecting end of the second named shaft, and a gear wheel on the inner end of this shaft and meshing with the other gear wheel, the shafts being removable longitudinally from the tubes, at their inner ends when the tubes are disconnected.

2. Apparatus as recited in claim 1, wherein the inner ends of the tubes have beveled surfaces that serve as seats, and the tubes are connected by angle plates that are detachably joined thereto.

References Cited in the file of this patent

UNITED STATES PATENTS

| 470,991 | Davis | Mar. 15, 1892 |
| 1,890,675 | Doerr et al. | Dec. 13, 1932 |
| 2,020,219 | Siriammi | Nov. 5, 1935 |
| 2,734,321 | Field | Feb. 14, 1956 |

FOREIGN PATENTS

| 738,037 | France | Oct. 11, 1932 |